(12) United States Patent
Otsubo et al.

(10) Patent No.: US 12,732,078 B2
(45) Date of Patent: Sep. 8, 2026

(54) RESOLVER ROTOR AND RESOLVER

(71) Applicant: KABUSHIKI KAISHA TOSHIBA, Tokyo (JP)

(72) Inventors: Yosuke Otsubo, Mie Mie (JP); Takashi Endo, Yokkaichi Mie (JP); Hideki Hisada, Kuwana Mie (JP); Kazuo Aoki, Mie Mie (JP); Kotaro Kobayashi, Mie Mie (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 113 days.

(21) Appl. No.: 18/808,195

(22) Filed: Aug. 19, 2024

(65) Prior Publication Data

US 2024/0413725 A1 Dec. 12, 2024

Related U.S. Application Data

(63) Continuation of application No. PCT/JP2022/046650, filed on Dec. 19, 2022.

(30) Foreign Application Priority Data

Aug. 3, 2022 (JP) ................................ 2022-124113

(51) Int. Cl.
*H02K 24/00* (2006.01)
*H02K 11/225* (2016.01)

(52) U.S. Cl.
CPC .......... *H02K 24/00* (2013.01); *H02K 11/225* (2016.01)

(58) Field of Classification Search
CPC ...... H02K 24/00; H02K 11/225; H02K 11/21; H02K 1/28; H02K 1/04; H02K 1/30;
(Continued)

(56) References Cited

U.S. PATENT DOCUMENTS 4,729,160 A * 3/1988 Brown .................. H02K 15/03 310/156.28
5,126,610 A * 6/1992 Fremerey ........... F16C 32/0478 310/90

(Continued)

FOREIGN PATENT DOCUMENTS

CN 112865421 B * 4/2024 ............ H02K 7/125
JP 2004048925 A 2/2004

(Continued)

OTHER PUBLICATIONS

International Search Report issued Mar. 7, 2023, in corresponding International Application No. PCT/JP2022/046650, 8 pages.

(Continued)

*Primary Examiner* — Maged M Almawri
(74) *Attorney, Agent, or Firm* — Maier & Maier, PLLC

(57) ABSTRACT

According to an embodiment, a resolver rotor includes: a resolver rotor core; and a resolver rotor core holder that constrains the resolver rotor core to a rotor shaft in a circumferential direction and an axial direction. The resolver rotor core holder includes: an annular flat plate portion; a first constraining portion that holds a relative position of the resolver rotor core holder to the rotor shaft, and holds an angle of the resolver rotor core in the circumferential direction relative to the rotor shaft; a second constraining portion that holds a relative position of the resolver rotor core holder to the rotor shaft; and a third constraining portion that holds a relative position of the resolver rotor core in the axial direction to the rotor shaft. The resolver rotor core includes a radially inside recessed portion for engagement with the first constraining portion.

11 Claims, 14 Drawing Sheets

(58) Field of Classification Search
CPC .......... H02K 1/24; H02K 17/165; H02K 5/02; H02K 5/12; H02K 5/124; H02K 5/128; H02K 15/0012; H02K 15/12
See application file for complete search history.

(56) References Cited

U.S. PATENT DOCUMENTS

| | | | | |
|---|---|---|---|---|
| 8,314,610 | B2 * | 11/2012 | Urano | G01D 5/2013 324/207.25 |
| 10,897,179 | B2 * | 1/2021 | Magri | H02K 1/2766 |
| 11,794,123 | B1 * | 10/2023 | Zhang | H02K 1/278 |
| 2002/0125780 | A1 * | 9/2002 | Shiratori | H02K 1/278 310/156.21 |
| 2008/0079327 | A1 * | 4/2008 | Makino | G01D 5/2013 310/90 |
| 2010/0019599 | A1 * | 1/2010 | Saban | H02K 3/50 310/156.12 |
| 2010/0019626 | A1 * | 1/2010 | Stout | H02K 3/50 310/214 |
| 2010/0156401 | A1 | 6/2010 | Nishiguchi et al. | |
| 2011/0057648 | A1 * | 3/2011 | Goto | G01D 5/145 324/207.25 |
| 2013/0162113 | A1 * | 6/2013 | Vedy | H02K 11/225 310/68 B |
| 2014/0345999 | A1 * | 11/2014 | Kitayama | F16D 27/108 192/44 |
| 2016/0072344 | A1 * | 3/2016 | Durantay | H02K 1/02 29/598 |
| 2017/0005549 | A1 * | 1/2017 | Ohira | H02K 24/00 |
| 2017/0310175 | A1 * | 10/2017 | Arimatsu | H02K 1/28 |
| 2017/0373548 | A1 * | 12/2017 | Arimatsu | H02K 1/2781 |
| 2018/0114622 | A1 * | 4/2018 | Fujihara | H01F 7/0247 |
| 2018/0323691 | A1 * | 11/2018 | Nakano | H02K 1/146 |
| 2019/0036401 | A1 * | 1/2019 | Takano | H02K 15/03 |
| 2019/0097500 | A1 * | 3/2019 | Yang | H02K 11/225 |
| 2019/0207448 | A1 * | 7/2019 | Ozasa | H02K 1/30 |
| 2021/0218322 | A1 * | 7/2021 | Mihaila | H02K 5/203 |
| 2023/0118484 | A1 * | 4/2023 | Sasaki | H02K 1/2733 310/156.31 |
| 2023/0119104 | A1 * | 4/2023 | Kotegawa | H02K 1/28 310/68 B |
| 2023/0188024 | A1 * | 6/2023 | Tang | H02K 7/09 |
| 2023/0268814 | A1 * | 8/2023 | Garrard | H02K 1/278 310/156.01 |
| 2024/0146131 | A1 * | 5/2024 | Coppola | H02K 1/28 |
| 2024/0343107 | A1 * | 10/2024 | Park | H02K 24/00 |

FOREIGN PATENT DOCUMENTS

| | | | | | |
|---|---|---|---|---|---|
| JP | 2007285774 | A | | 11/2007 | |
| JP | 2008275385 | A | * | 11/2008 | |
| JP | 4628904 | B2 | | 11/2010 | |
| JP | 2012093101 | A | | 5/2012 | |
| JP | 5002859 | B2 | | 6/2012 | |
| JP | 5059021 | B2 | * | 10/2012 | B62D 5/0427 |
| JP | 2013021810 | A | * | 1/2013 | H02K 11/225 |
| JP | 2013198324 | A | * | 9/2013 | |
| JP | 2016154428 | A | * | 8/2016 | |
| JP | 6136477 | B2 | | 5/2017 | |
| JP | 2017116428 | A | | 6/2017 | |
| JP | 2017116429 | A | | 6/2017 | |
| JP | 2018129988 | A | | 8/2018 | |
| JP | 2020171083 | A | | 10/2020 | |
| JP | 7166414 | B1 | | 10/2022 | |
| JP | 6263330 | B2 | | 8/2024 | |
| JP | 2024121218 | A | * | 9/2024 | |
| KR | 20140003677 | A | | 1/2014 | |
| WO | WO-2015052962 | A1 | * | 4/2015 | H02K 11/21 |

OTHER PUBLICATIONS

Extended European Search Report issued on Jun. 26, 2026, in corresponding European Application No. 22954089.3, 6 pages.

* cited by examiner

RESOLVER ROTOR AND RESOLVER

CROSS-REFERENCE TO RELATED APPLICATIONS

This application is a continuation of prior International Application No. PCT/JP2022/046650, filed on Dec. 19, 2022; and claims the benefit of priority from Japanese Application No. 2022-124113 filed on Aug. 3, 2022, the entire contents of all of which are incorporated herein by reference.

FIELD

The present invention relates to a resolver rotor and a resolver.

BACKGROUND

In the rotary electric machines, a rotation angle sensor has been widely used to detect the rotation angle of a rotary shaft. A resolver, which is one of the rotation angle sensors, is composed of, for example, a resolver rotor fixed to a rotary shaft of a rotary electric machine to rotate together with the rotary shaft, and a resolver stator arranged to face the outer circumference of the resolver rotor. Such a resolver measures a variation in the facing distance (gap) between the resolver rotor and the resolver stator and detects the rotation angle of the rotary shaft.

In order to improve the detection accuracy of the rotation angle, the resolver rotor needs to inhibit the displacement of the resolver rotor itself relative to the rotary shaft as much as possible. For example, a method has conventionally been employed in which the resolver rotor is positioned in the circumferential direction by forming a key groove in the rotary shaft and providing a key shape in the resolver rotor. Further, for example, after the resolver rotor is clearance fitted to the rotary shaft, a member such as a collar is press-fitted into the rotary shaft to press the resolver rotor in the axial direction, thereby making it possible to inhibit the displacement of the resolver rotor in the axial direction. In addition, the displacements of the resolver rotor in the circumferential direction and the radial direction can also be inhibited with the frictional force generated between the member such as a collar and the resolver rotor.

On the other hand, when the resolver rotor is pressed in the axial direction by a predetermined member press-fitted into the rotary shaft to thereby be positioned, it is necessary to appropriately adjust the load (pressing force) to be applied for inhibiting the displacement of the resolver rotor relative to the rotary shaft.

DETAILED DESCRIPTION

Figure 1:
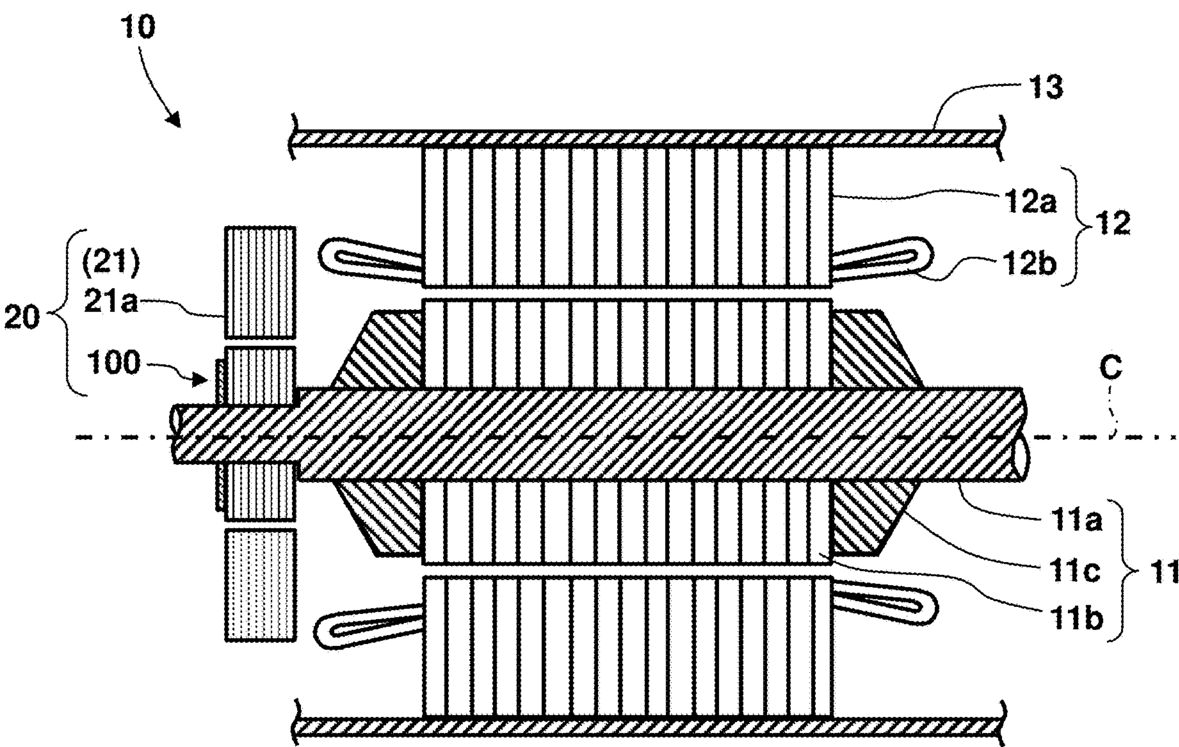
FIG. 1 is a sectional longitudinal view illustrating an example where a resolver according to a first embodiment is installed in a rotary electric machine

An object of the present invention is to provide a resolver rotor and a resolver that enable displacement inhibition and load adjustment.

Means for Solving the Problems

To attain the above-described object, a resolver rotor according to an embodiment of the present invention is a resolver rotor of a resolver that detects a rotation angle of a rotating part of a target rotary electric machine, the resolver rotor including: a resolver rotor core that is mounted on a radially outer side of a rotor shaft of the target rotary electric machine and includes a plurality of resolver rotor plates stacked in an axial direction of the rotor shaft; and a resolver rotor core holder that holds relative positions of the resolver rotor core in a circumferential direction and the axial direction to the rotor shaft, in which the resolver rotor core holder includes: an annular flat plate portion; a first constraining portion that is formed to protrude from an inner edge side of the flat plate portion with being sandwiched between two groove portions formed in the inner edge side of the flat plate portion, holds a relative position of the resolver rotor core holder to the rotor shaft, and holds an angle of the resolver rotor core in the circumferential direction relative to the rotor shaft; a second constraining portion that is formed to protrude from an inner edge side of the flat plate portion with being sandwiched between two groove portions formed in the inner edge side of the flat plate portion and holds a relative position of the resolver rotor core holder to the rotor shaft; and a third constraining portion that is formed on an inner edge side of the flat plate portion and holds a relative position of the resolver rotor core in the axial direction to the rotor shaft, and the resolver rotor core includes a radially inside recessed portion formed in an inner edge portion to engage with the first constraining portion.

There will be explained a resolver rotor according to an embodiment of the present invention with reference to the drawings below. Here, common reference numerals and symbols are given to parts that are the same as or similar to each other, and redundant explanations are omitted.

First Embodiment

FIG. 1 is a sectional longitudinal view illustrating an example where a resolver 20 according to a first embodiment is installed in a rotary electric machine 10.

The rotary electric machine 10 includes a rotor 11 being a rotating part that rotates around a rotation axis C, a stator 12, a frame 13, and the resolver 20.

The rotor 11 includes a rotor shaft 11*a* extending in the rotation axis direction, a rotor core 11*b* provided on the radially outer side of the rotor shaft 11*a*, and two end plates 11*c* that are provided on both sides of the rotor core 11*b* in the axial direction to constrain the rotor core 11*b* in the axial direction. The rotor shaft 11*a*, the rotor core 11*b*, and the two end plates 11*c* rotate as a single unit around a rotation axis C of the rotor shaft. In the following explanation, the direction along the rotation axis C of the rotor shaft 11*a* is defined as the axial direction, and the rotation direction of the rotor shaft 11*a* is defined as the circumferential direction. Further, the direction perpendicular to the axial direction and the circumferential direction is defined as the radial direction, and the side approaching an axial center C in the radial direction is defined as the inner side, and the side moving away from the axial center C in the radial direction is defined as the outer side.

The stator 12 includes a stator core 12*a* arranged on the radially outer side of the rotor core 11*b*, and a stator winding 12*b* passing through the stator core 12*a*.

The frame 13 houses the rotor core 11*b*, the stator 12, and the like.

The resolver 20 is mostly housed within the frame 13 and includes a resolver stator 21 and a resolver rotor 100.

The resolver rotor 100, which will be explained in detail with reference to FIG. 2 and subsequent drawings, is mounted on the rotor shaft 11*a* and rotates together with the rotor shaft 11*a*.

The resolver stator 21 is provided on the radially outer side of the resolver rotor 100 with a gap provided therebetween, and is supported by the frame 13 or a stationary part connected thereto. The resolver stator 21 includes a resolver stator core 21*a* and a resolver stator winding (not illustrated) wound around the resolver stator core 21*a*.

Figure 2:
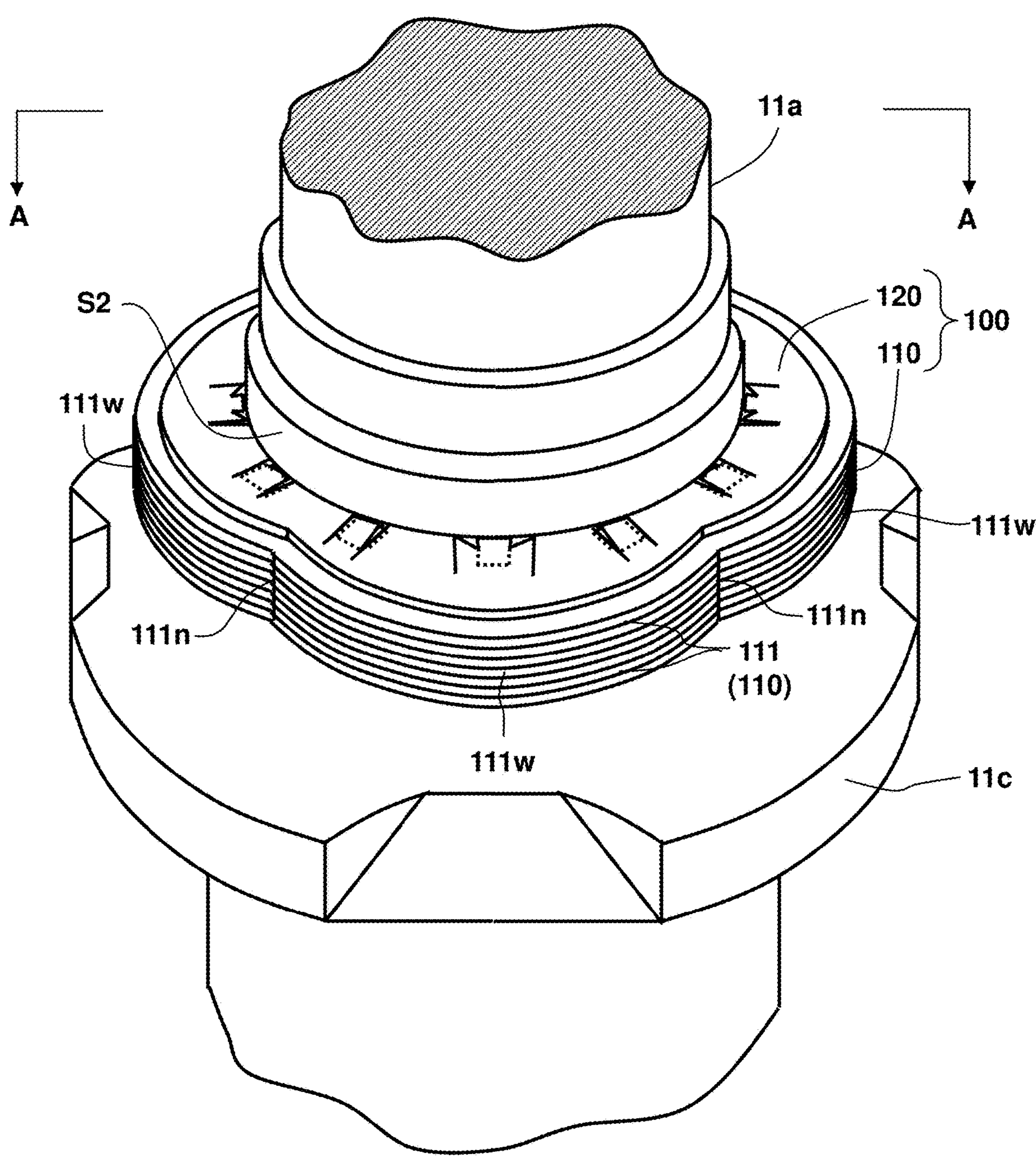
FIG. 2 is a perspective view illustrating a configuration of a resolver rotor according to the first embodiment
Figure 3:
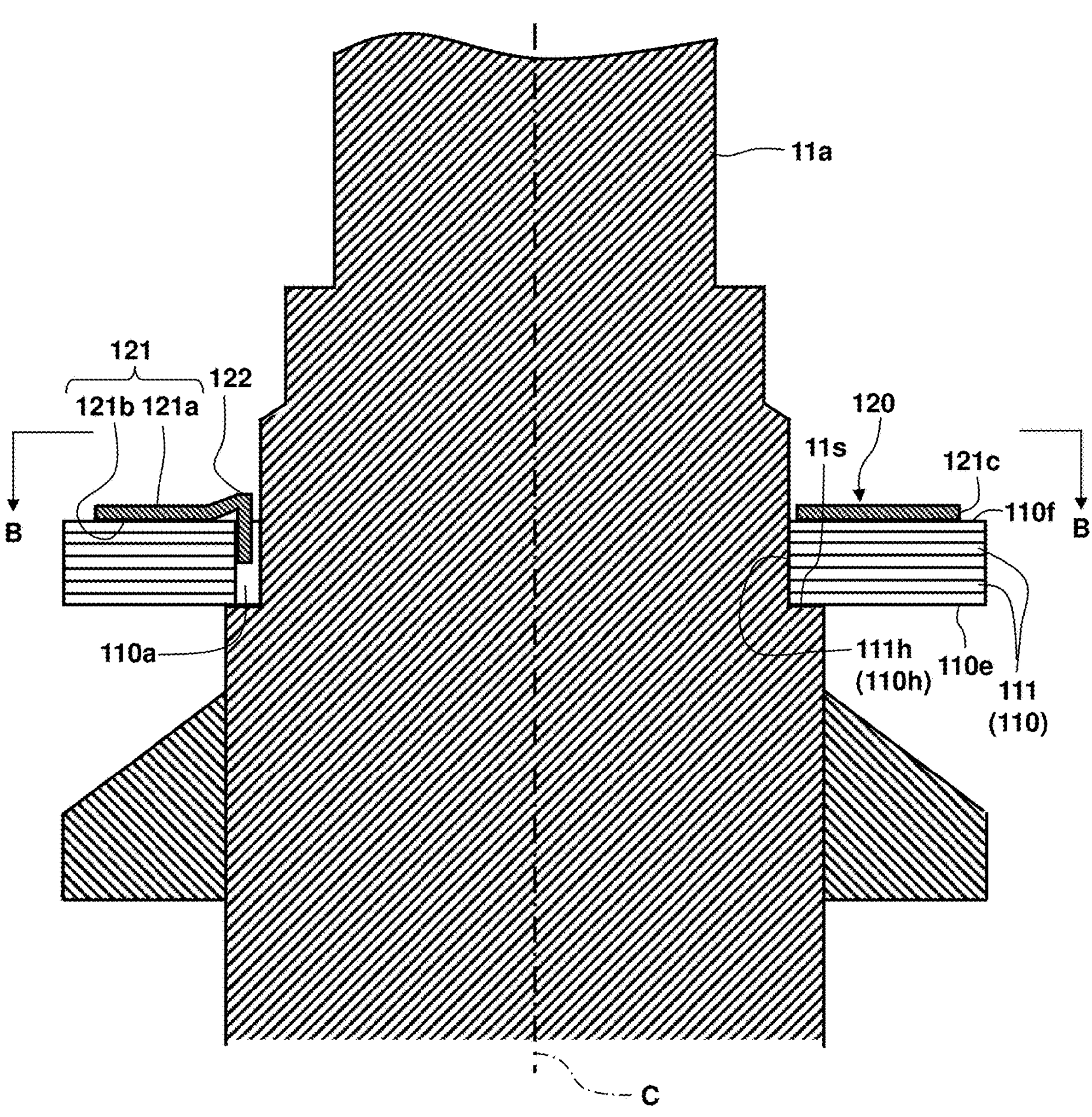
FIG. 3 is a sectional longitudinal view illustrating the configuration of the resolver rotor according to the first embodiment, viewed in the A-A arrow direction in FIG. 2

FIG. 2 is a perspective view illustrating a configuration of the resolver rotor 100 according to the first embodiment. Further, FIG. 3 is a sectional longitudinal view illustrating the configuration of the resolver rotor according to the first embodiment, viewed in the A-A arrow direction in FIG. 2.

The resolver rotor 100 includes a resolver rotor core 110 including a plurality of resolver rotor plates 111, each of which is made of, for example, an electromagnetic steel sheet, stacked in the axial direction, and a resolver rotor core holder 120 that constrains the resolver rotor core 110.

The resolver rotor core 110 is formed by stacking a plurality of plate-shaped members (to be referred to as the resolver rotor plate 111 below). The resolver rotor plates 111 are formed in a manner that steel sheets are each formed into an annular shape having the same shape and size, and the resolver rotor plates 111 are connected together in the axial direction by, for example, caulking or another means to form a single unit.

Each of the resolver rotor plates 111 has a circular center opening 111*h* formed in the center and having the same diameter. The resolver rotor plates 111 are stacked with the center openings 111*h* concentrically communicating with each other. The resolver rotor plates 111 are stacked in this manner and the center openings 111*h* are communicated, and thereby, a through hole 110*h* is created in the center of the resolver rotor core 110. The center opening 111*h* is formed so that the diameter (inside diameter) of the center opening 111*h* is set to a size that enables a clearance fit at an outer circumferential portion of the rotor shaft 11*a*. Thereby, the resolver rotor core 110 can be mounted on the rotor shaft 11*a* with the through hole 110*h* clearance-fitted to the outer circumference of the rotor shaft 11*a*.

Further, the contour of the outer circumferential edge of the resolver rotor plate 111 (to be referred to as an outer circumferential shape below) is formed into a noncircular shape that varies a gap with the resolver stator 21. For example, the resolver rotor plate 111 has an outer circumferential shape in which a plurality of wide-width portions 111*w* having the same curvature, which is larger than the curvature of an inner circumferential portion of the facing resolver stator 21, are lined up in the circumferential direction. The wide-width portions 111*w* that are adjacent to each other in the circumferential direction are continuous with each narrow-width portion 111*n* provided therebetween. The narrow-width portion 111*n* is a portion in which the outer circumferential shape of the resolver rotor plate 111 is concavely depressed, and that is formed by the adjacent wide-width portions 111*w*, and has the minimum diameter across the outer circumferential shape. That is, the resolver rotor plate 111 has a planar shape in which the wide-width portion 111*w* and the narrow-width portion 111*n* are alternately continuous, and each outer circumferential shape of the wide-width portion 111*w* and each outer circumferential shape of the narrow-width portion 111*n* are alternately continuous at the outer circumferential edge.

In this embodiment, as one example, four wide-width portions 111*w* and four narrow-width portions 111*n* are each provided, and are arranged point-symmetrically about the axial center C. However, the number of wide-width portions 111*w* and the number of narrow-width portions 111*n* are not particularly limited.

In the resolver 20 (FIG. 1), the resolver rotor core 110 is rotated relative to the resolver stator 21, thereby making it possible to vary the gap therebetween periodically. At this time, the rotation angle of the rotor shaft 11*a* with the resolver rotor core 110 mounted thereon is detected based on the variation in the gap. For example, when a magnetic field is formed by applying a current to a coil wound around the resolver stator 21 while the rotor shaft 11*a* is rotating, the resolver rotor core 110 rotates in this magnetic field. Therefore, by detecting the state where a magnetic flux changes at that time, the rotation angle of the rotor shaft 11*a* can be detected. The resolver 20 composed of the resolver rotor core 110 and the resolver stator 21 outputs a rotation angle signal corresponding to the rotation angle of the resolver rotor that rotates with the rotation of the rotor shaft 11*a* to a control device (not illustrated). Thereby, the control device performs rotation control of the rotary electric machine based on the output rotation angle signal.

The resolver rotor core 110 is supported by a seat surface 11*s* (FIG. 3) of the rotor shaft 11*a* in the axial direction, with the through hole 110*h* clearance-fitted to the outer circumference of the rotor shaft 11*a*. As illustrated in FIG. 3, the seat surface 11*s* is a stepped portion made by a diameter difference between a large diameter portion and a small diameter portion at the outer circumferential portion of the rotor shaft 11*a*, and is a continuous annular flat portion in the circumferential direction. In the example illustrated in FIG. 3, the resolver rotor core 110 has an axial end surface (lower surface in FIG. 3, to be referred to as a first end surface blow) 110*e* thereof butted against the seat surface 11*s*, and the first end surface 110*e* is in surface contact with the seat surface 11*s*. In this case, the resolver rotor core 110 has the first end surface 110*e* butted against the seat surface 11*s* with the rotor shaft 11*a* inserted through the through hole 110*h* from above in the axial direction.

With the first end surface 110*e* being in surface contact with the seat surface 11*s* in this manner, the resolver rotor core 110 is supported by the resolver rotor core holder 120 relative to the rotor shaft 11*a*.

The resolver rotor core holder 120 is an annular member that can be press-fitted into the rotor shaft 11*a*, and positions and fixes the resolver rotor core 110 in the axial direction with sandwiching the resolver rotor core 110 with the seat surface 11*s*. The resolver rotor core holder 120 is formed of a raw material with a linear coefficient of expansion similar to that of the rotor shaft 11*a*, for example, in order to inhibit changes in the fixed state of the resolver rotor core 110 caused by temperature changes. As long as this is satisfied, a specific raw material is not particularly limited.

Figure 4:
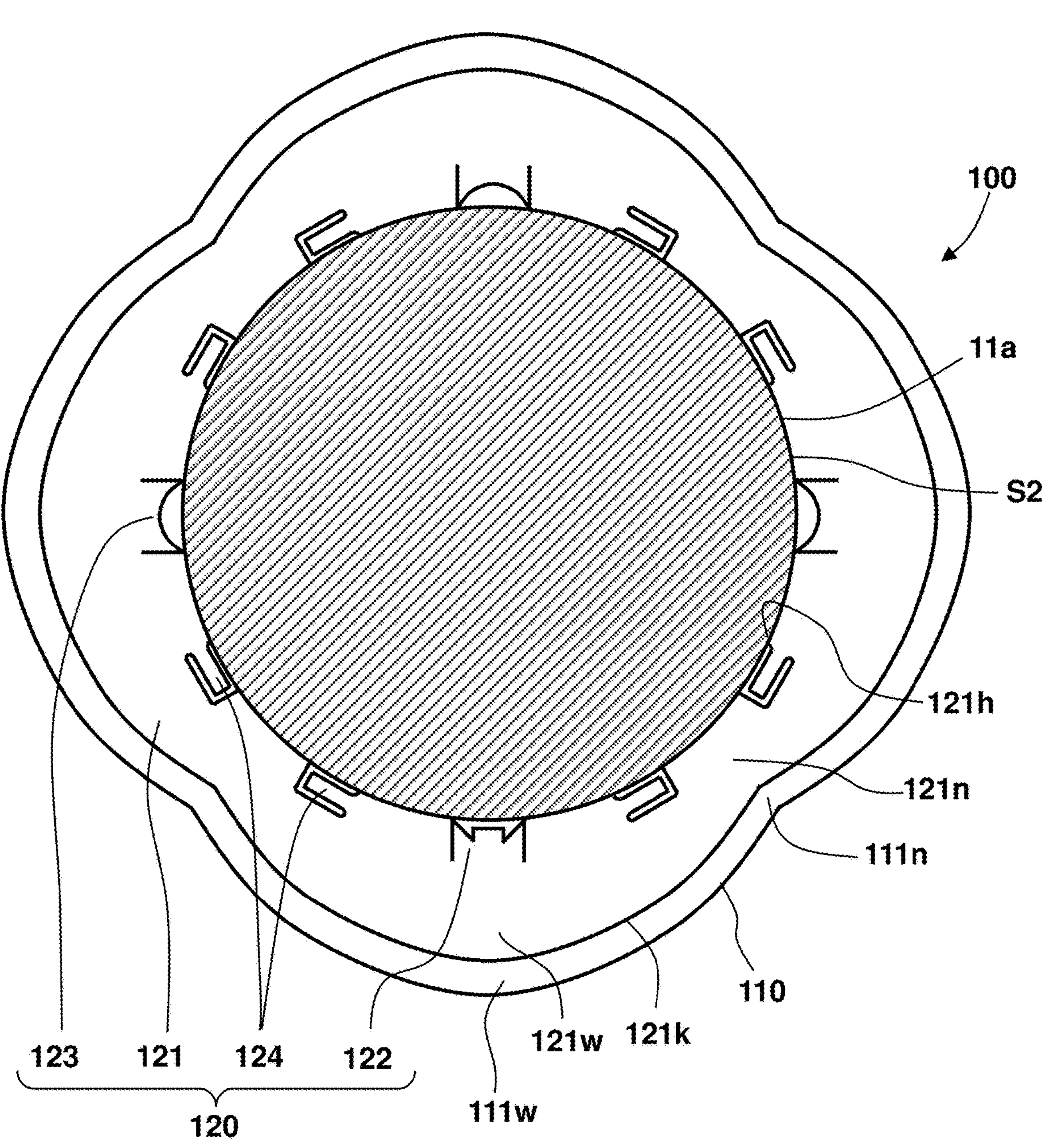
FIG. 4 is a front view illustrating a configuration of a rotor core holder of the resolver rotor according to the first embodiment, viewed in the B-B arrow direction in FIG. 3

FIG. 4 is a front view illustrating a configuration of the rotor core holder 120 of the resolver rotor according to the first embodiment, viewed in the B-B arrow direction in FIG. 3. That is, FIG. 4 illustrates a mapped shape of the rotor core holder 120 on a virtual plane in the B-B arrow direction.

As illustrated in FIG. 4, the resolver rotor core holder 120 includes an annular flat plate portion 121 and three types of constraining portions provided on the inner edge 121*h* side of the flat plate portion 121, namely, a first constraining portion 122, second constraining portions 123, and third constraining portions 124.

The flat plate portion 121 extends along the other end surface (to be referred to as a second end surface below) 110*f* of the resolver rotor core 110 in the axial direction. The second end surface 110*f* is a surface on the side opposite to the first end surface 110*e* in the axial direction, and is an upper surface in the example illustrated in FIG. 3.

The flat plate portion 121 comes into contact with the second end surface 110*f* in a state where the resolver rotor core holder 120 is press-fitted into the rotor shaft 11*a* to position and fix the resolver rotor core 110. In this state, the contour of the outer circumferential edge (outer circumferential shape) of the flat plate portion 121 is a noncircular shape that is one size smaller than the outer circumferential shape of the resolver rotor core 110. This prevents the outer circumferential edge of the flat plate portion 121 from protruding from the outer circumferential edge of the resolver rotor core 110, and the magnetic flux change detected by the resolver, that is, the effect on the detection accuracy of the rotation angle of the rotor shaft 11*a* is suppressed.

As illustrated in FIG. 4, the flat plate portion 121 includes narrow-width portions 121*n* and wide-width portions 121*w*. The narrow-width portion 121*n* is a portion having the narrowest width when viewed from an outer circumferential surface 121*c* (FIG. 3) of the flat plate portion 121 in the direction normal to the outer circumferential surface 121*c* inwardly. The normal direction corresponds to the radial direction. The outer circumferential surface 121*c* of the flat plate portion 121 is a surface portion that connects the outer circumferential edge of a first surface 121*a* and the outer circumferential edge of a second surface 121*b*. The wide-width portion 121*w* is a portion wider in width than the narrow-width portion 121*n*. Here, the first surface 121*a* and the second surface 121*b* are end surfaces at both ends in the axial direction respectively, and the second surface 121*b* is a surface that comes into contact with the second end surface 110*f* of the resolver rotor core 110.

The wide-width portions 121*w* each have an outer circumferential shape that is curved in the circumferential direction with the same curvature, which is larger than the curvature of the wide-width portion 111*w* of the resolver rotor plate 111. The wide-width portions 121*w* that are adjacent to each other in the circumferential direction are continuous with each narrow-width portion 121*n* provided therebetween. The narrow-width portion 121*n* is a portion in which the outer circumferential shape of the flat plate portion 121 is concavely depressed, and that is formed by the adjacent wide-width portions 121*w*, and has the minimum diameter across the outer circumferential shape. That is, the flat plate portion 121 has a planar shape in which the wide-width portion 121*w* and the narrow-width portion 121*n* are alternately continuous. In this embodiment, as one example, four wide-width portions 121*w* and four narrow-width portions 121*n* are each provided, which is the same number as those of the resolver rotor plate 111, and are arranged point-symmetrically about the axial center C. However, the number of wide-width portions 121*w* and the number of narrow-width portions 121*n* are not particularly limited and do not need to match the number of those of the resolver rotor plate 111.

As described above, the resolver rotor core holder 120 includes the single first constraining portion 122, the three second constraining portions 123, and the eight third constraining portions, each of which is formed as a constraining portion. However, the number of constraining portions is not limited to these.

The first constraining portion 122 is provided based on the center angle in the circumferential direction of one of the four wide-width portions 111*w* set as the center. The first constraining portion 122 has a function of holding the relative position between the first constraining portion 122 itself and the rotor shaft 11*a*, and a function of constraining the resolver rotor core 110 in the circumferential direction.

The second constraining portions 123 each are provided based on the center angle in the circumferential direction of one of the other three of the four wide-width portions 111*w*, where the first constraining portion 122 is not provided, set as the center. The second constraining portion 123 has a function of holding the relative position between the second constraining portion 122 itself and the rotor shaft 11*a*.

The third constraining portion 124 has a function of constraining the resolver rotor core 110 in the axial direction. The third constraining portion 124 is arranged on both sides of the first constraining portion 122 and both sides of each of the three second constraining portions 123 in the circumferential direction, and the third constraining portions 124 are arranged symmetrically to each other with the first constraining portion 122 and each of the three second constraining portions 123 sandwiched therebetween at intervals on a virtual plane. Incidentally, in FIG. 4, the respective third constraining portions 124 extend toward the first constraining portion 122 and the three second constraining portions 123 respectively, but may also extend in opposite directions as long as they are symmetrically arranged.

When each of the first constraining portion 122 and the three second constraining portions 123 and the two third constraining portions 124 arranged on both sides of each constraining portion are a set, each set is arranged at intervals from each other in the circumferential direction. Further, four sets are arranged in accordance with the magnetic pole arrangement of the resolver 20, in other words, for each pole of the resolver rotor core 110.

Hereinafter, these constraining portions will be explained with reference to the respective drawings.

Figure 5:
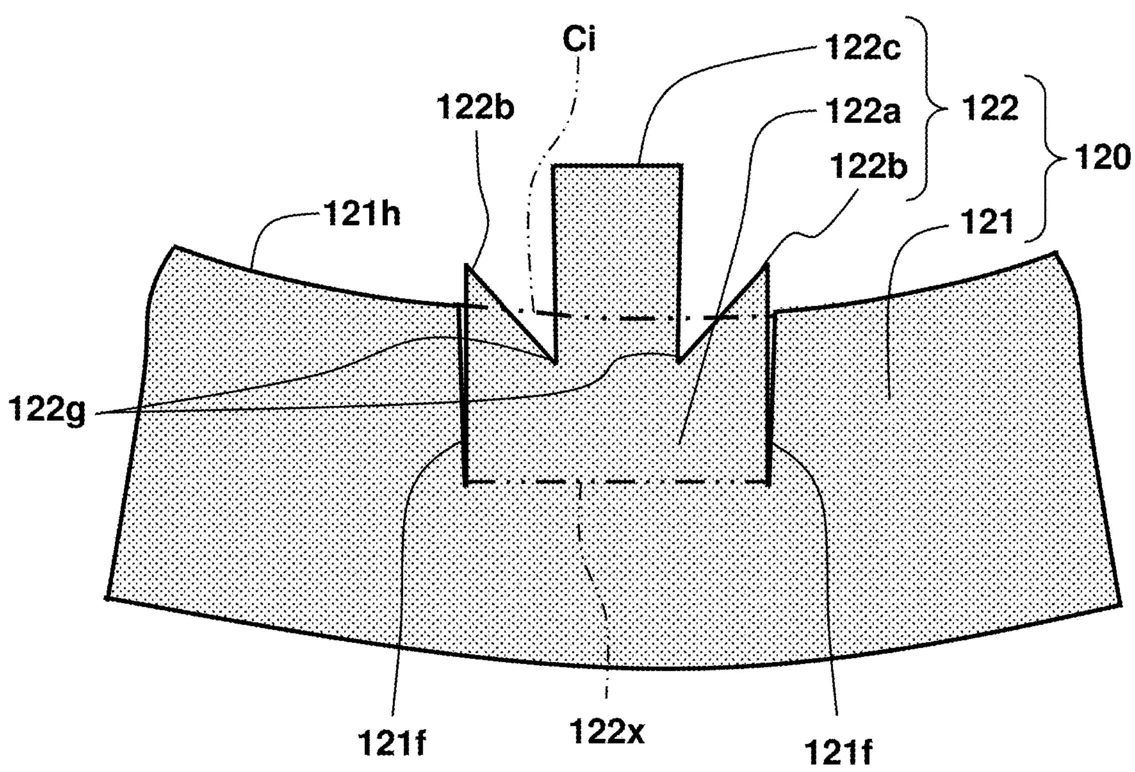
FIG. 5 is a partial plan view illustrating a state of a first constraining portion after the rotor core holder of the resolver rotor according to the first embodiment is punched out
Figure 6:
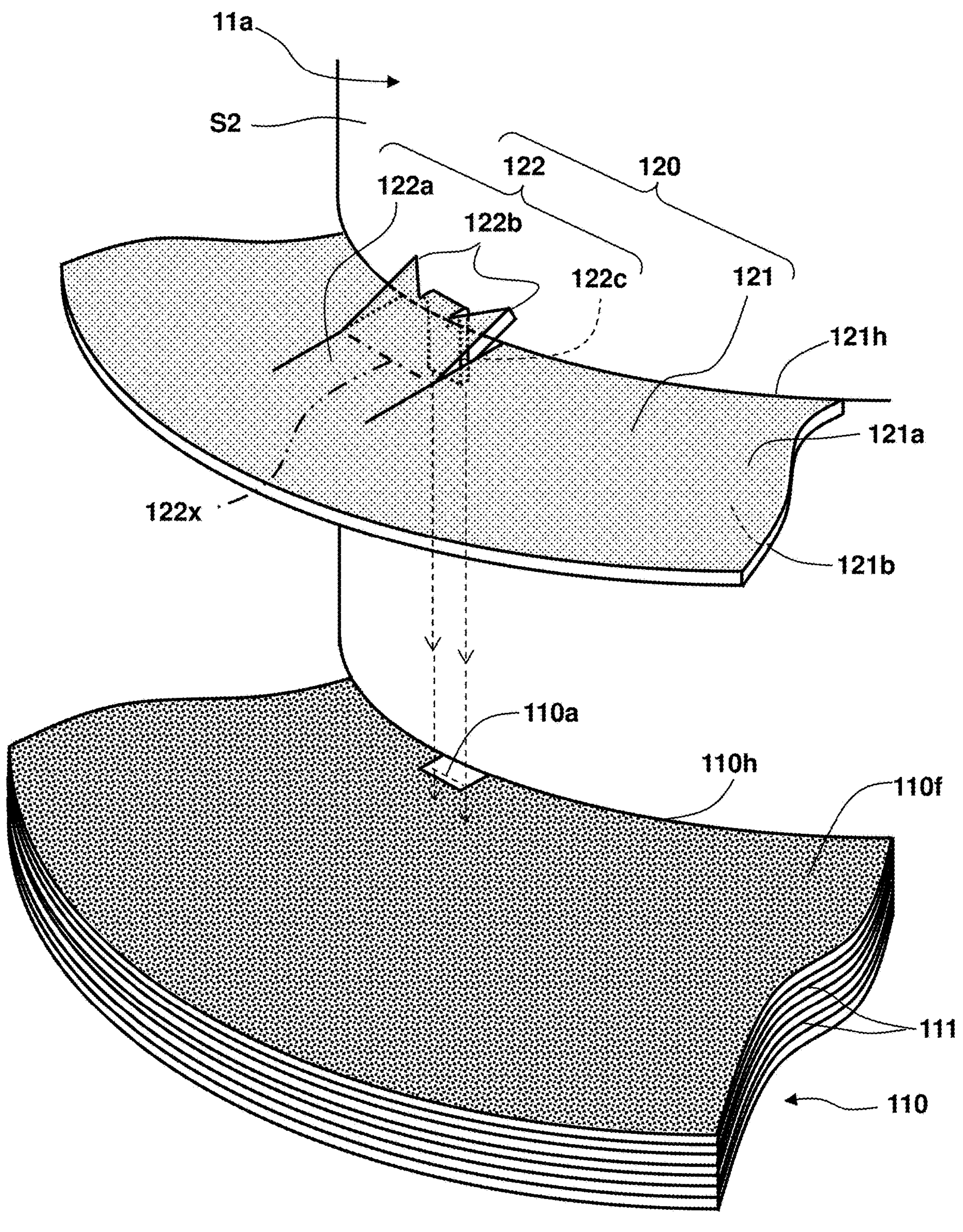
FIG. 6 is a perspective view illustrating the first constraining portion in a state where the rotor core holder of the resolver rotor according to the first embodiment is installed

FIG. 5 is a partial plan view illustrating a state of the first constraining portion 122 after the rotor core holder 120 of the resolver rotor 100 according to the first embodiment is punched out. Further, FIG. 6 is a perspective view illustrating the first constraining portion 122 in a state where the rotor core holder 120 of the resolver rotor 100 according to the first embodiment is installed.

FIG. 5 illustrates a state of the rotor core holder 120 after being punched out, that is, a state where surfaces of respective portions of the rotor core holder 120 are on the same plane. In FIG. 5, a virtual inscribed circle including the inner edge 121*h* of the first surface 121*a* (FIG. 3) of the flat plate portion 121 is illustrated as a virtual circle Ci. Incidentally, in FIG. 6, the rotor core holder 120, which is in close contact with the second end surface 110*f* of the resolver rotor core 110, is illustrated separated from the second end surface 110*f* for convenience of explanation.

The first constraining portion 122 includes an extension portion 122*a*, two claw portions 122*b*, and a protruding-shape tongue portion 122*c*.

The extension portion 122*a* is sandwiched between two groove portions 121*f* formed in the inner edge 121*h* side of the flat plate portion 121. In the state illustrated in FIG. 5, the extension portion 122*a* is formed to protrude from the virtual circle Ci in the direction of the rotation axis C (FIG. 3), namely, inward in the radial direction.

The two claw portions 122*b* are each formed to have an acute angle shape at the tip of the extension portion 122*a* in the circumferential direction of the extension portion 122*a*, namely, on both sides of the extension portion 122*a* in the width direction. In the state illustrated in FIG. 5, the tips of the two claw portions 122*b* each protrude inward in the radial direction so as to be inside the virtual circle Ci.

The protruding-shape tongue portion 122*c* is sandwiched between the two claw portions 122*b*, protrudes from the virtual circle Ci in the direction of a cutting step, and is bent toward the resolver rotor core 110 side to engage with a radially inside recessed portion 110*a* formed in the resolver rotor core 110, as will be described later with reference to FIG. 6.

Branching portions 122*g* where the protruding-shape tongue portion 122*c* branches off from the respective claw portions 122*b* are each formed so that their radial positions ensure a sufficient distance from the inner edge 121*h* of the flat plate portion 121, which is a distance from the inner edge 121*h* to the outer edge in the radial direction, so as to prevent the bent protruding-shape tongue portion 122*c* from coming into contact with the rotor shaft 11*a* (see FIG. 4). This is to prevent the decrease in pressing force of the claw portions 122*b* toward the rotor shaft 11*a*, which is caused by the protruding-shape tongue portion 122*c* coming into contact with the rotor shaft 11*a*.

Each portion of the first constraining portion 122 is elastically deformable starting from a first bending portion 122*x* that bends toward the first surface 121*a* side of the flat plate portion 121. Here, the first bending portion 122*x* is a portion between branching portions of the two groove portions 121*f*. As a result, each portion of the first constraining portion 122 is elastically deformed from the outer circumferential surface 121*c* of the wide-width portion 111*w* in the inward normal direction of the outer circumferential surface 121*c*, in brief, inward in the radial direction, starting from the first bending portion 122*x*. That is, the first constraining portion 122 functions as a spring piece.

As illustrated in FIG. 6, the first constraining portion 122 includes the two claw portions 122*b* that are in contact with an outer circumferential surface S2 of the rotor shaft 11*a*. The claw portion 122*b* is a radial tip portion (extending end portion) at the first constraining portion 122. When the resolver rotor core holder 120 is press-fitted into the rotor shaft 11*a*, the claw portions 122*b* come into contact with the outer circumferential surface S2, and thereby, the first constraining portion 122 is pressed from the outer circumferential surface S2 to be elastically deformed relative to the flat plate portion 121 so as to warp outward. Then, with the resolver rotor core holder 120 positioning and fixing the resolver rotor core 110, in other words, with the flat plate portion 121 being in contact with the second end surface 110*f* of the resolver rotor core 110, the claw portions 122*b* press the outer circumferential surface S2 with the restoring force of elastic deformation of the first constraining portion 122. Thereby, the first constraining portion 122 supports the resolver rotor core holder 120 (in brief, the flat plate portion 121) in the radial direction and the axial direction relative to the rotor shaft 11*a*, and positions and fixes it.

As the contact mode between the claw portions 122*b* and the outer circumferential surface S2 is closer to a point contact, it becomes possible to intensively apply a pressing force to the outer circumferential surface S2 from the claw portions 122*b*. Therefore, in order to more firmly position the resolver rotor core holder 120 relative to the rotor shaft 11*a*, it is preferable that the claw portions 122*b* should make a line contact or a point contact with the outer circumferential surface S2 rather than making a surface contact. From this point of view, in this embodiment, the claw portions 122*b* each make substantially a point contact with the outer circumferential surface S2 at their two points.

At this time, the claw portions 122*b* press the outer circumferential surface S2 of the rotor shaft 11*a* with the restoring force of elastic deformation and this restoring force absorbs the load (pressing force) in the axial direction generated by the claw portions 122*b* being elastically deformed to inhibit deformation such as twisting of the flat plate portion 121.

As a result, the first constraining portion 122 is to rotate with the rotor shaft 11*a* integrally in a concentric state.

Incidentally, the pressing by the claw portions 112 can be adjusted by adjusting the elasticity of the elastic deformation by the length between the first bending portion 122*x* and each of the claw portions 122*b*, or by the thickness of the flat plate if the resolver rotor core holder 120 is punched out from a flat plate having a uniform thickness, or by the position of the branching portion 122*g*, namely, the width of the claw portion 122*b*, or the like.

As illustrated in FIG. 6, the radially inside recessed portion 110*a* is formed at the through hole 110*h* of the resolver rotor core 110, namely, at the inner edge in the radial direction, at a predetermined depth from the second end surface 110*f* toward the first end surface 110*e*.

When the resolver rotor core holder 120 is press-fitted into the rotor shaft 11*a*, the protruding-shape tongue portion 122*c* is inserted into the radially inside recessed portion 110*a* without coming into contact with the outer circumferential surface S2 of the rotor shaft 11*a*.

The width of the radially inside recessed portion 110*a* in the circumferential direction is set so that the protruding-shape tongue portion 122*c* can be inserted thereinto and a gap is as small as possible.

As a result, the resolver rotor core 110 is constrained by the protruding-shape tongue portion 122*c* of the first constraining portion 122 that rotates with the rotor shaft 11*a* integrally, and the angular position with the rotor shaft 11*a* does not shift in the circumferential direction. That is, the resolver rotor core 110 is constrained in the circumferential direction by the protruding-shape tongue portion 122*c* of the first constraining portion 122.

Figure 7:
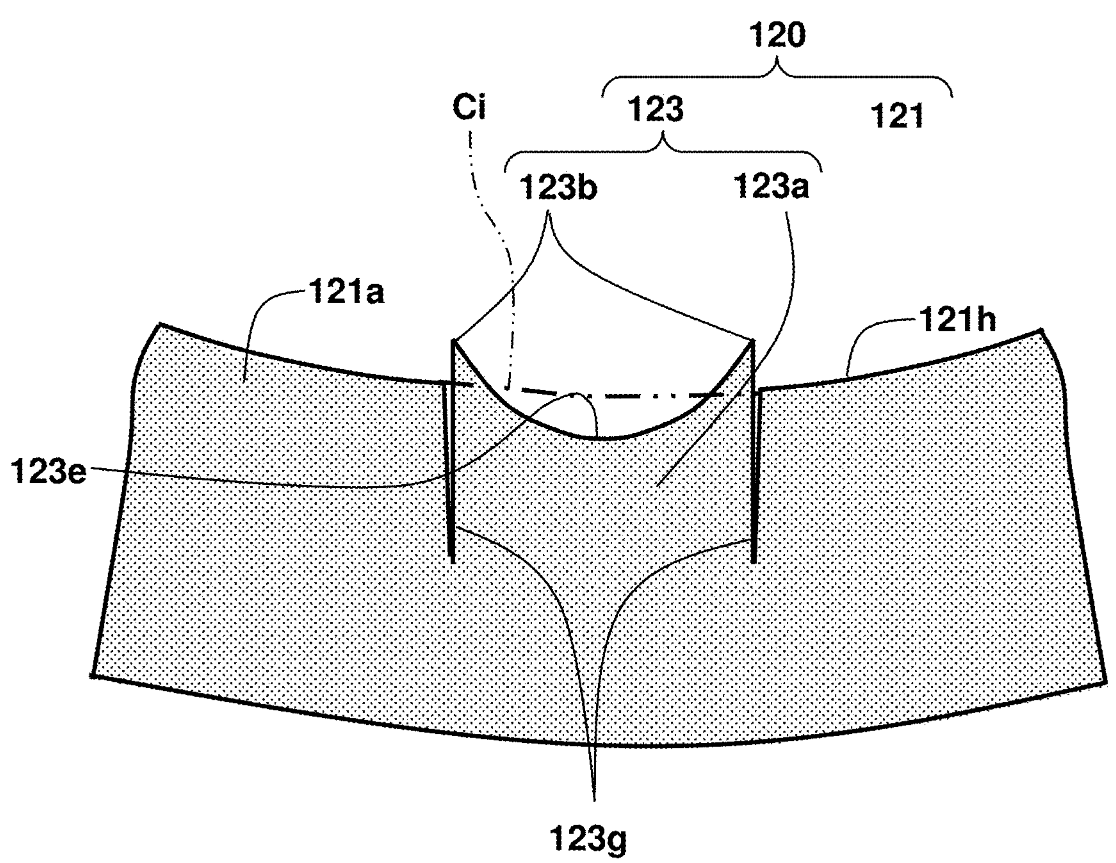
FIG. 7 is a partial plan view illustrating a state of a second constraining portion after the rotor core holder of the resolver rotor according to the first embodiment is punched out
Figure 8:
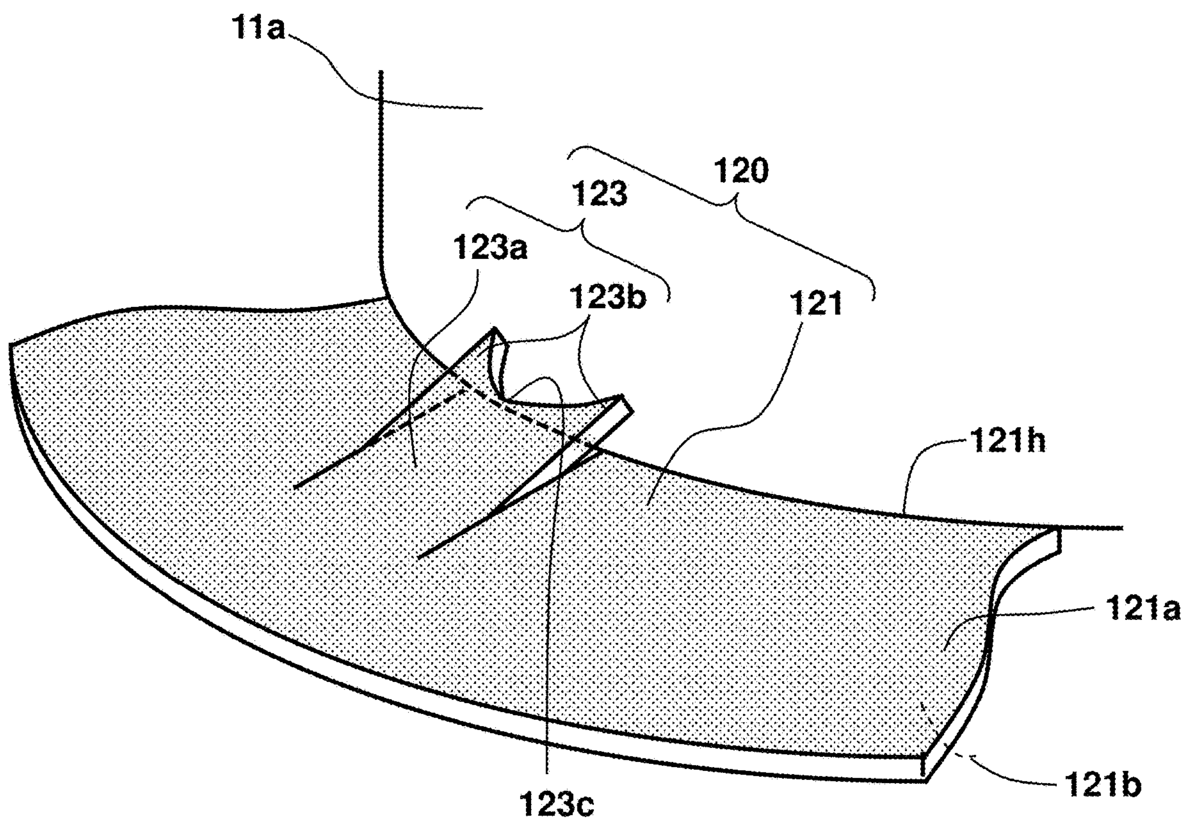
FIG. 8 is a perspective view illustrating the second constraining portion of the resolver rotor core holder in a state where the rotor core holder of the resolver rotor according to the first embodiment is installed

FIG. 7 is a partial plan view illustrating a state of the second constraining portion 123 after the rotor core holder 120 of the resolver rotor 100 according to the first embodiment is punched out. Further, FIG. 8 is a perspective view illustrating the second constraining portion 123 of the resolver rotor core holder 120 in a state where the rotor core holder 120 of the resolver rotor 100 according to the first embodiment is installed.

The second constraining portion 123 includes an extension portion 123*a* and two claw portions 123*b*.

The extension portion 123*a* is sandwiched between two groove portions 123*g* formed in the inner edge 121*h* side of the flat plate portion 121. A concave portion 123*c* is formed at the tip of the extension portion on the radially inner side, resulting in that the two claw portions 123*b* are formed. In the state illustrated in FIG. 7, the tips of the two claw portions 123*b* protrude inward in the radial direction so as to be inside the virtual circle Ci.

When the resolver rotor core holder 120 is press-fitted into the rotor shaft 11*a*, the claw portions 122*b* come into contact with the outer circumferential surface S2, and thereby, the second constraining portion 123 is pressed from the outer circumferential surface S2 to be elastically deformed relative to the flat plate portion 121 so as to warp outward. Then, with the resolver rotor core holder 120 positioning and fixing the resolver rotor core 110, in other words, with the flat plate portion 121 being in contact with the second end surface 110*f* of the resolver rotor core 110, the claw portions 123*b* press the outer circumferential surface S2 with the restoring force of elastic deformation of the second constraining portion 123. Thereby, the second constraining portion 123 supports the resolver rotor core holder 120 in the radial direction, the circumferential direction, and the axial direction relative to the rotor shaft 11*a*, and positions and fixes it. Regarding these points, the second constraining portion 123 is the same as the first constraining portion 122.

Here, in a state where the claw portions 123*b* are in contact with the outer circumferential surface S2, the concave portion 123*c* is formed to have a shape that provides a gap between it and the outer circumferential surface S2, resulting in that the concave portion 123*c* does not come into contact with the outer circumferential surface S2. At this time, the claw portions 123*b* press the outer circumferential surface S2 of the rotor shaft 11*a* with the restoring force of elastic deformation, and this restoring force absorbs the load (pressing force) in the axial direction generated by the claw portions 123*b* being elastically deformed to inhibit deformation such as twisting of the flat plate portion 121. As a result, the second constraining portion 123 reliably constrains the resolver rotor core holder 120 in the radial direction, the circumferential direction, and the axial direction relative to the rotor shaft 11*a*.

Incidentally, the pressing by the claw portions 123*b* can be adjusted by adjusting the elasticity of the elastic deformation by the length between the groove portion 123*g* and the claw portion 123*b*, the shape or dimensions of the concave portion 123*c* that determine the shape·width of the claw portions 123*b*, or the like.

Figure 9:
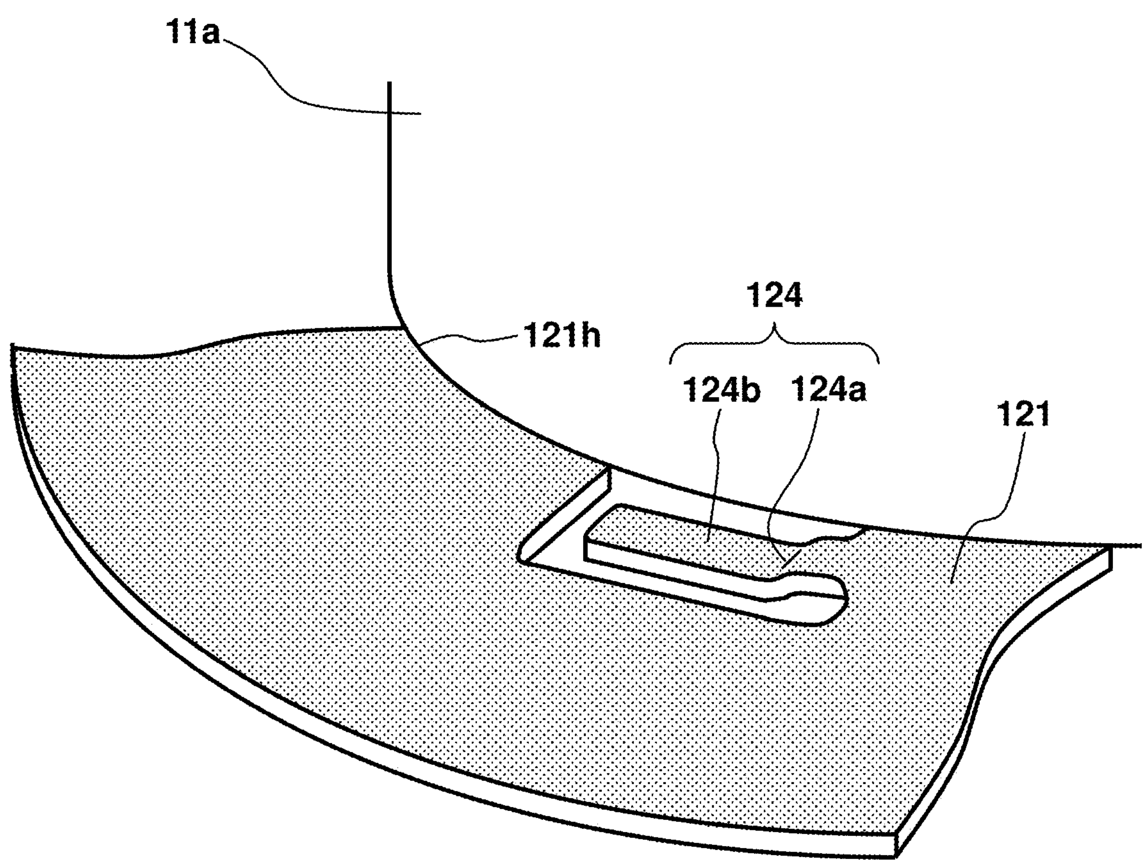
FIG. 9 is a perspective view illustrating a third constraining portion of the resolver rotor core holder of the resolver rotor according to the first embodiment

FIG. 9 is a perspective view illustrating the third constraining portion 124 of the resolver rotor core holder 120 of the resolver rotor 100 according to the first embodiment.

The third constraining portion 124 is a plate formed by punching out a portion of the flat plate portion 121 in the vicinity of the inner edge 121*h*. When viewed from the direction illustrated in FIG. 4, the third constraining portion 124 extends from the flat plate portion 121 along the circumferential direction of the surface S2 with a gap provided between it and the surface S2 of the rotor shaft 11*a*. The third constraining portion 124 includes a base end portion 124*a* and a contact portion 124*b*.

The base end portion 124*a* is a stepped portion formed so as to approach the second end surface 110*f* of the resolver rotor core 110 in the direction in which the third constraining portion 124 extends.

A surface of the contact portion 124*b* that faces the second end surface 110*f* of the resolver rotor core 110 comes into contact with the second end surface 110*f* of the resolver rotor core 110. That is, the third constraining portion 124 is formed as a spring piece that allows the contact portion 124*b* to be elastically deformed relative to the base end portion 124*a*.

When the resolver rotor core holder 120 is press-fitted into the rotor shaft 11*a*, the contact portion 124*b* is pressed from the second end surface 110*f* of the resolver rotor core 110 by coming into contact with the second end surface 110*f*, and is elastically deformed relative to the base end portion 124*a* so as to warp upward. Conversely, the contact portion 124*b* of the third constraining portion 124, which is a portion extending from the flat plate portion 121, presses the second end surface 110*f* of the resolver rotor core 110 with the restoring force of elastic deformation while being in contact with the second end surface 110*f*. As a result, the contact portion 124*b* presses the resolver rotor core 110 toward a seat surface S1 of the rotor shaft 11*a*. That is, in this state, the resolver rotor core holder 120 sandwiches the resolver rotor core 110 with the seat surface S1, to position and fix it in the axial direction. Further, the resolver rotor core holder 120 sandwiches the resolver rotor core 110 with the seat surface 11S in the axial direction, and thereby constrains the resolver rotor core 110 planarly, namely, in the radial direction and the axial direction, by the frictional force with the contact portion 124*b*.

Incidentally, the pressing by the contact portion 124*b* can be adjusted by adjusting the elasticity of the elastic deformation by the shape or dimensions of the base end portion 124*a*, the width and length of the contact portion 124*b*, or the like.

As explained above, according to this embodiment, the resolver rotor core holder 120 includes the first constraining portion 122 and the second constraining portions 123, thereby making it possible to position and fix the resolver rotor core holder 120 in the axial direction, the radial direction, and the circumferential direction relative to the rotor shaft 11*a*.

Further, the protruding-shape tongue portion 122*c* of the first constraining portion 122 of the resolver rotor core holder 120 are fitted into the radially inside recessed portion 110*a* formed in the resolver rotor core 110, and thereby the resolver rotor core 110 is positioned and fixed in the circumferential direction. Further, the third constraining portion 124 of the resolver rotor core holder 120 sandwiches the resolver rotor core 110 between the resolver rotor core holder 120 and the seat surface S1, thereby making it possible to position and fix the resolver rotor core 110 in the axial direction.

As above, the resolver rotor core holder 120, which is positioned and fixed to the rotor shaft 11*a*, constrains the resolver rotor core 110, thereby enabling displacement inhibition and load adjustment.

Second Embodiment

Figure 10:
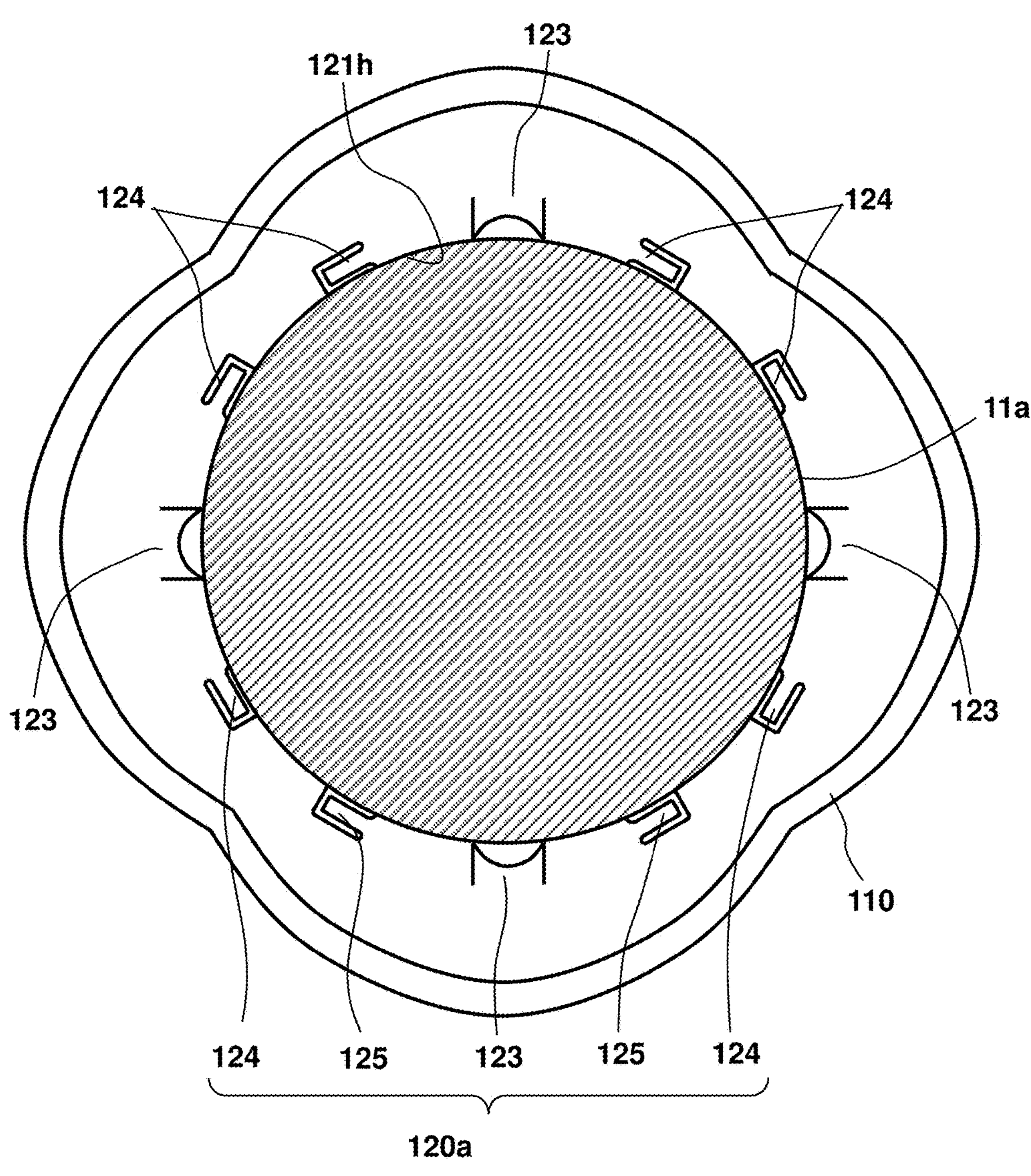
FIG. 10 is a front view illustrating a configuration of a rotor core holder of a resolver rotor according to a second embodiment

FIG. 10 is a front view illustrating a configuration of a rotor core holder 120*a* of a resolver rotor according to a second embodiment.

This embodiment is a modification of the first embodiment. In this embodiment, the resolver rotor core holder 120*a* includes four second constraining portions 123, six third constraining portions 124, and two fourth constraining portions 125.

The second constraining portion 123 has the same configuration and shape as the second constraining portion 123 in the first embodiment. The second constraining portions 123 are each arranged so as to have a circumferential center portion thereof located at the circumferential center of the wide-width portion 121W on a virtual plane. In place of the first constraining portion 122 and the three second constraining portions 123 in the first embodiment, in this embodiment, the resolver rotor core holder 120*a* is constrained to the rotor shaft 11*a* in the radial direction, the circumferential direction, and the axial direction by the four second constraining portions 123. That is, the resolver rotor core holder 120*a* and the rotor shaft 11*a* are in a state of being coupled in the radial direction, the circumferential direction, and the axial direction.

The two fourth constraining portions 125 are arranged on both sides of one of the four second constraining portions 123, at the same positions as the third constraining portions 124 in the first embodiment.

The third constraining portions 124 are arranged at the same positions as the third constraining portions 124 in the first embodiment, in a manner to sandwich each of the other three second constraining portions 123 that are not sandwiched by the fourth constraining portions 125.

When each of the four second constraining portions 123 and the two third constraining portions 124 or the two fourth constraining portions 125 arranged on both sides of each of the four second constraining portions 123 are a set, each set is arranged at intervals from each other in the circumferential direction. Further, four sets are arranged in accordance with the magnetic pole arrangement of the resolver 20, in other words, for each pole of the resolver rotor core 110.

Hereinafter, the fourth constraining portions 125, which are different from the first embodiment, will be explained, and the second constraining portions 123 and the third constraining portions 124 are not explained because they are the same as those in the first embodiment.

Figure 11:
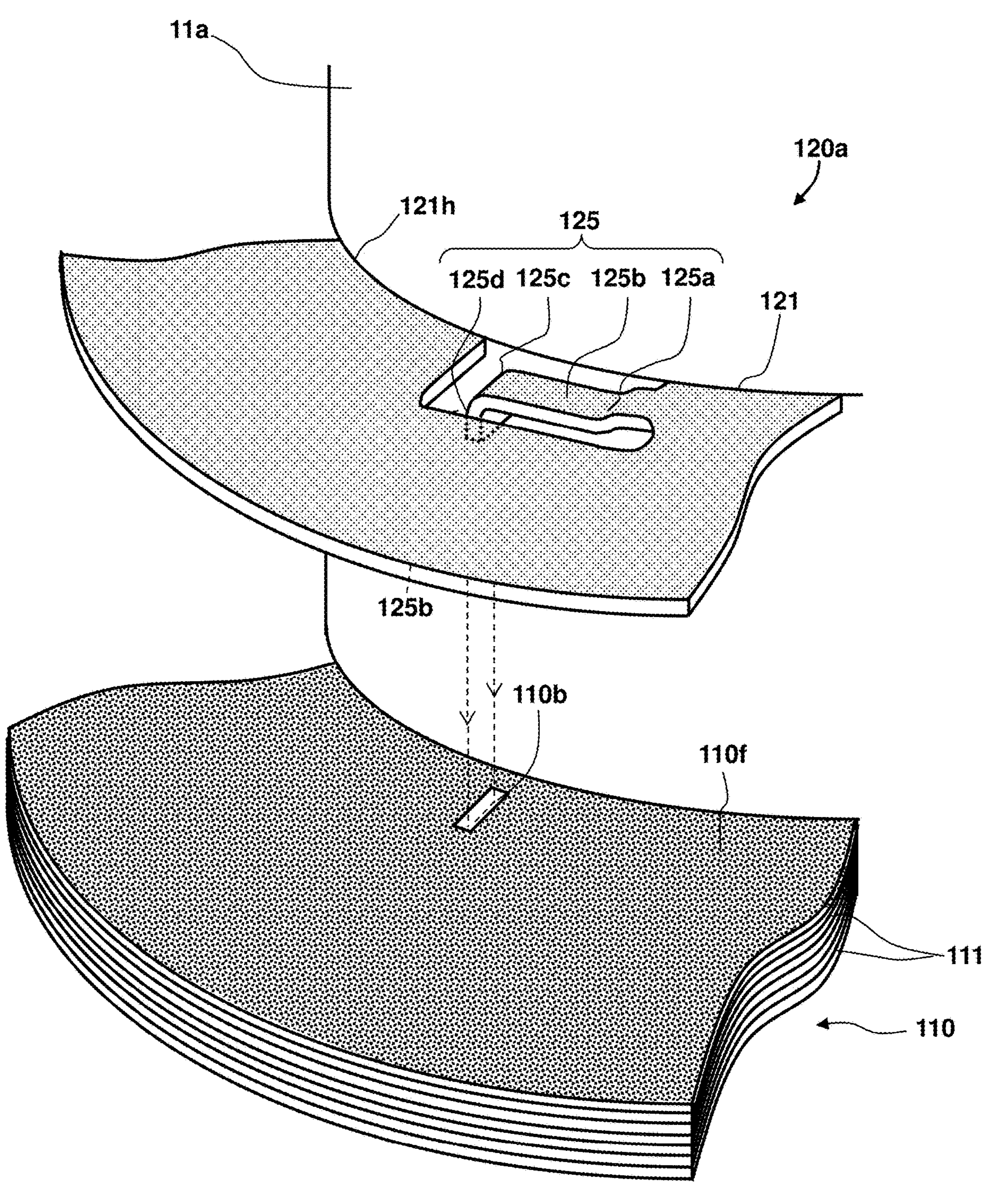
FIG. 11 is a perspective view illustrating a fourth constraining portion of the rotor core holder of the resolver rotor according to the second embodiment

FIG. 11 is a perspective view illustrating the fourth constraining portion 125 of the rotor core holder 120*a* of the resolver rotor 100 according to the second embodiment. Incidentally, in FIG. 11, the rotor core holder 120, which is in close contact with the second end surface 110*f* of the resolver rotor core 110, is illustrated separated from the second end surface 110*f* for convenience of explanation.

The fourth constraining portion 125 is a plate formed by punching out a portion of the flat plate portion 121 in the vicinity of the inner edge 121*h*. When viewed from the direction illustrated in FIG. 10, the fourth constraining portion 125 extends from the flat plate portion 121 along the circumferential direction of the surface S2 with a gap provided between it and the surface S2 of the rotor shaft 11*a*. The fourth constraining portion 125 includes a base end portion 125*a*, a contact portion 125*b*, a bent portion 125*c*, and an insertion portion 125*d*.

The base end portion 125*a* is a stepped portion formed so as to approach the second end surface 110*f* of the resolver rotor core 110 in the direction in which the fourth constraining portion 125 extends.

A surface of the contact portion 125*b* that faces the second end surface 110*f* of the resolver rotor core 110 comes into contact with the second end surface 110*f* of the resolver rotor core 110. That is, the fourth constraining portion 125 is formed as a spring piece that allows the contact portion 125*b* to be elastically deformed relative to the base end portion 125*a*.

Incidentally, the pressing by the contact portion 125*b* can be adjusted by adjusting the elasticity of the elastic deformation by the shape or dimensions of the base end portion 125*a*, the width and length of the contact portion 125*b*, or the like.

The bent portion 125*c* is a portion that is bent 90 degrees toward the second end surface 110*f* side of the resolver rotor core 110 in the direction in which the contact portion 125*b* extends.

The insertion portion 125*d* is a portion formed by the portion extending from the contact portion 125*b* being turned in direction by the bent portion 125*c* and extending perpendicularly to the second end surface 110*f* of the resolver rotor core 110.

The resolver rotor core 110 has constraining holes 110*b* formed at positions corresponding to the insertion portions 125*d* of the two fourth constraining portions 125, into which the insertion portions 125*d* can be inserted.

Figure 12:
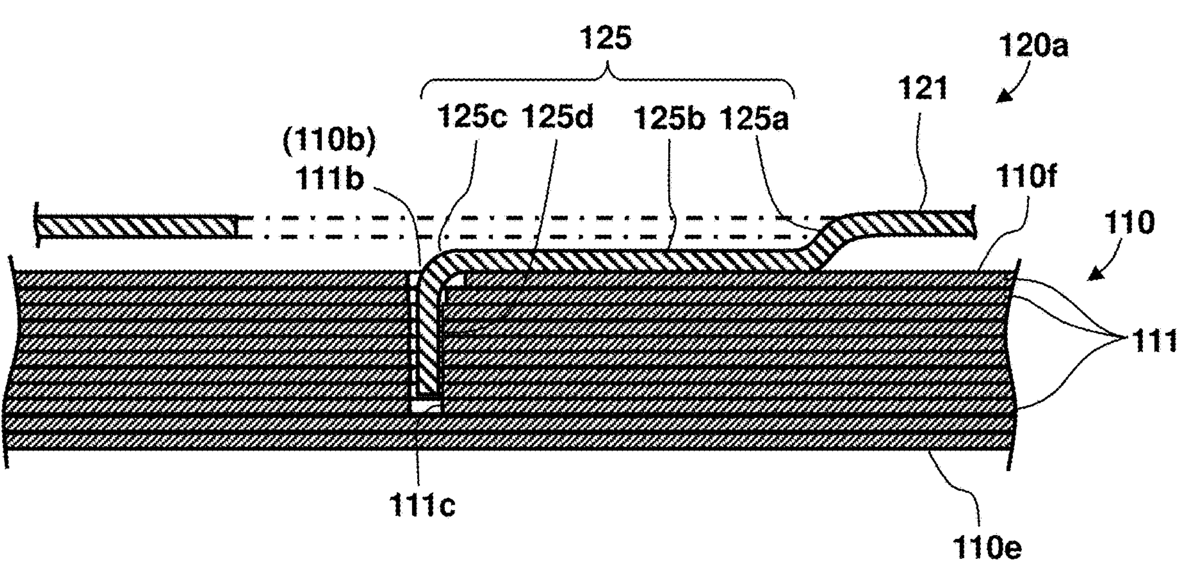
FIG. 12 is a sectional longitudinal view illustrating the relationship between a first example of the fourth constraining portion of the rotor core holder of the resolver rotor according to the second embodiment and a constraining hole formed in a resolver rotor core

FIG. 12 is a sectional longitudinal view illustrating the relationship between a first example of the fourth constraining portion 125 of the rotor core holder 120*a* of the resolver rotor 100 according to the second embodiment and the constraining hole 110*b* formed in the resolver rotor core 110. That is, FIG. 12 is a longitudinal cross-sectional view along the direction in which the fourth constraining portion 125 extends.

The constraining hole 110*b* in the resolver rotor core 110 is formed by constraining holes 111*b* formed in the respective resolver rotor plates 111 stacked in the axial direction communicating with each other.

The insertion portion 125*d* is a portion extending from the contact portion 125*b* and turned in direction 90 degrees by the bent portion 125*c*. Here, the contact portion 125*b* needs to come into contact with the second end surface 110*f* of the resolver rotor core 110. Therefore, for the resolver rotor plate 111 corresponding to the portion of the bent portion 125*c* and the resolver rotor plate 111 forming the depth for the curvature radius of the bent portion 125*c* from the second end surface 110*f* of the resolver rotor core 110, the constraining holes 111*b* are widened and formed to prevent interference between the bent portion 125*c* and the resolver rotor plate 111.

The insertion portion 125*d* comes into close contact with constraining side surfaces 111*c* of the constraining holes

111*b* in the resolver rotor plates 111 located away from the second end surface 110*f* of the resolver rotor core 110, namely, located closer to the first end surface 110*e*.

When the resolver rotor core 110 attempts to turn in the circumferential direction, the insertion portion 125*d* is pressed by the constraining side surfaces 111*c* of the constraining holes 111*b*, and is elastically deformed relative to the bent portion 125*c* so as to warp in the circumferential direction. Conversely, the insertion portion 125*d*, which is the portion extending from the contact portion 125*b*, presses the constraining side surfaces 111*c* by the restoring force of elastic deformation while being in contact with the constraining side surfaces 111*c* of the respective resolver rotor plates 111 of the resolver rotor core 110. As a result, the contact portion 125*b* constrains the resolver rotor core 110 in the circumferential direction.

Incidentally, the pressing by the insertion portion 125*d* can be adjusted by adjusting the elasticity of the elastic deformation by the curvature radius of the bent portion 125*c*, the width and length of the insertion portion 125*d*, or the like.

Figure 13:
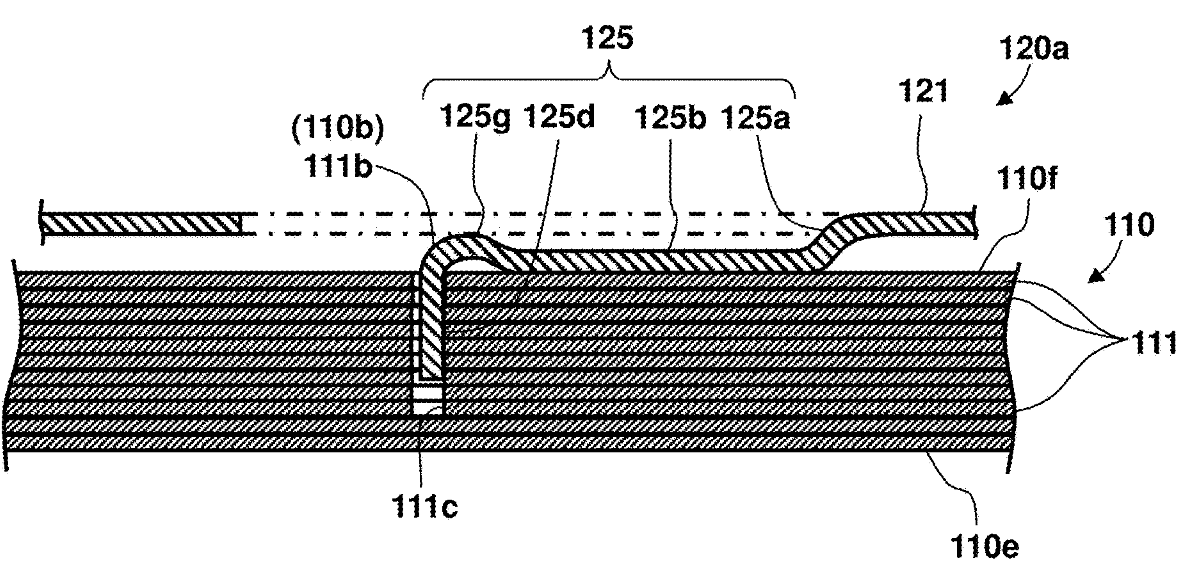
FIG. 13 is a sectional longitudinal view illustrating the relationship between a second example of the fourth constraining portion of the rotor core holder of the resolver rotor according to the second embodiment and the constraining hole formed in the resolver rotor core

FIG. 13 is a sectional longitudinal view illustrating the relationship between a second example of the fourth constraining portion 125 of the rotor core holder 120*a* of the resolver rotor 100 according to the second embodiment and the constraining hole 110*b* formed in the resolver rotor core 110. That is, FIG. 13 is a longitudinal cross-sectional view along the direction in which the fourth constraining portion 125 extends.

This second example includes a bent portion 125*g* different from the bent portion 125*c* in the first example.

The bent portion 125*g* is that a portion extending from the contact portion 125*b* is once bent so as to move away from the second end surface 110*f* of the resolver rotor core 110, and then is bent toward the second end surface 110*f* of the resolver rotor core 110. Thereby, the insertion portion 125*d* connected to the bent portion 125*g* is formed so as to be perpendicular to the contact portion 125*b*.

This configuration prevents the bent portion 125*g* from being located inside the resolver rotor core 110, namely, being located on the first end surface 110*e* side rather than the second end surface 110*f* of the resolver rotor core 110. That is, only the insertion portion 125*d* is housed in the constraining hole 110*b* of the resolver rotor core 110. As a result, the positions of the constraining side surfaces 111*c* of the constraining holes 111*b* of the respective resolver rotor plates 111 all can be the same.

Figure 14:
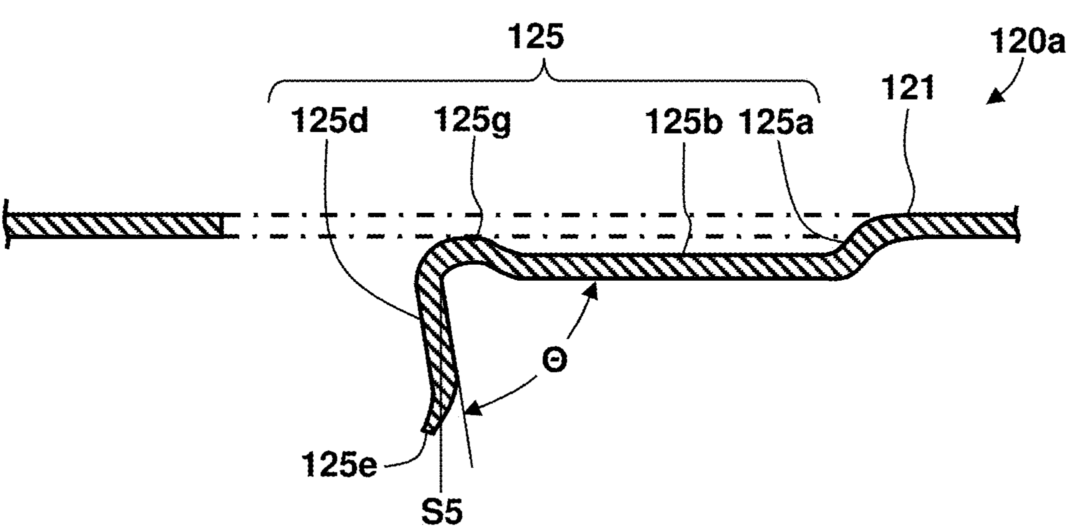
FIG. 14 is a sectional longitudinal view illustrating a modified example of the second example of the fourth constraining portion of the rotor core holder of the resolver rotor according to the second embodiment

FIG. 14 is a sectional longitudinal view illustrating a modified example of the second example of the fourth constraining portion of the rotor core holder of the resolver rotor according to the second embodiment.

In this modified example, in a state before the resolver rotor core holder 120 is press-fitted into the rotor shaft 11*a*, the bent portion 125*g* is formed so that an angle Q between the insertion portion 125*d* connected to the bent portion 125*g* and the contact portion 125*b* is an angle smaller than 90 degrees. As a result, in a state before the resolver rotor core holder 120 is press-fitted into the rotor shaft 11*a*, the insertion portion 125*d* is shaped to be on the inner side relative to the constraining side surfaces 111*c* of the constraining holes 111*b* of the respective resolver rotor plates 111, that is, it is shaped to interfere with the respective resolver rotor plates 111.

At the tip of the insertion portion 125*d*, a guiding portion 125*e* is provided. The guiding portion 125*e* serves as a guide for insertion into the constraining hole 110*b* when the resolver rotor core holder 120 is press-fitted into the rotor shaft 11*a*, because the insertion portion 125*d* is inclined inward by more than 90 degrees, to thus deviate from an insertion position into the constraining hole 110*b* if the insertion portion 125*d* remains as it is.

In this modified example formed in this manner, in a state after press-fitting of the resolver rotor core holder 120, the bent portion 125*g* is already elastically deformed, and thus the insertion portion 125*d* presses the constraining side surfaces 111*c* of the constraining holes 111*b* of the respective resolver rotor plates 111 with the restoring force of elastic deformation. This allows the contact portion 125*b* to further ensure a circumferential constraining force for the resolver rotor core 110.

According to the embodiments described above, it is possible to provide a resolver rotor and a resolver that enable displacement inhibition and load adjustment.

Other Embodiments

While certain embodiments have been described, these embodiments have been presented by way of example only, and are not intended to limit the scope of the inventions. Further, the features of the embodiments may be combined. The embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A resolver rotor being a resolver rotor of a resolver that detects a rotation angle of a rotating part of a target rotary electric machine, the resolver rotor comprising:

a resolver rotor core that is mounted on a radially outer side of a rotor shaft of the target rotary electric machine and includes a plurality of resolver rotor plates stacked in an axial direction of the rotor shaft; and a resolver rotor core holder that holds relative positions of the resolver rotor core in a circumferential direction and the axial direction to the rotor shaft, wherein the resolver rotor core holder includes:

an annular flat plate portion;

a first constraining portion that is formed to protrude from an inner edge side of the flat plate portion with being sandwiched between two groove portions formed in the inner edge side of the flat plate portion, holds a relative position of the resolver rotor core holder to the rotor shaft, and holds an angle of the resolver rotor core in the circumferential direction relative to the rotor shaft;

a second constraining portion that is formed to protrude from an inner edge side of the flat plate portion with being sandwiched between two groove portions formed in the inner edge side of the flat plate portion and holds a relative position of the resolver rotor core holder to the rotor shaft; and a third constraining portion that is formed on an inner edge side of the flat plate portion and holds a relative position of the resolver rotor core in the axial direction to the rotor shaft, and the resolver rotor core includes a radially inside recessed portion formed in an inner edge portion to engage with the first constraining portion.

2. The resolver rotor according to claim 1, wherein the first constraining portion includes:

two claw portions that are provided on both sides of the protruding portion in the circumferential direction and hold a relative portion of the resolver rotor core holder to the rotor shaft; and a protruding-shape tongue portion that is sandwiched between the two claw portions and is bent to have a tip thereof engage with the radially inside recessed portion, and in a state where the resolver rotor core holder is installed in the rotor shaft, the two claw portions are pressed against the rotor shaft by elastic force of the protruding portion.

3. The resolver rotor according to claim 1, wherein the third constraining portion has a stepped base end portion formed at a connection portion with the flat plate portion to approach the side of the resolver rotor core.

4. The resolver rotor according to claim 1, wherein at the flat plate portion, a wide-width portion whose distance from an outer edge of the flat plate portion to the center of rotation of the rotating part is large and a narrow-width portion whose distance from the outer edge of the flat plate portion to the center of rotation of the rotating part is small are alternately formed, the first constraining portion and the second constraining portion are arranged at the circumferential center of each of the wide-width portions, and the third constraining portion is arranged on the side of the narrow-width portion adjacent to the first constraining portion or the second constraining portion.

5. The resolver rotor according to claim 1, wherein the second constraining portion includes:

two claw portions that are provided on both sides of the protruding portion in the circumferential direction and hold a relative portion of the resolver rotor core holder to the rotor shaft; and in a state where the resolver rotor core holder is installed in the rotor shaft, the two claw portions are pressed against the rotor shaft by elastic force of the protruding portion.

6. A resolver, comprising:

the resolver rotor according to claim 1; and a resolver stator including: a cylindrical resolver core arranged at a radially outer side of the resolver rotor core of the resolver rotor with a gap provided therebetween; and a resolver winding wound around the resolver core.

7. A resolver rotor being a resolver rotor of a resolver that detects a rotation angle of a rotating part of a target rotary electric machine, the resolver rotor comprising:

a resolver rotor core that is mounted on a radially outer side of a rotor shaft of the target rotary electric machine and includes a plurality of resolver rotor plates stacked in an axial direction of the rotor shaft; and a resolver rotor core holder that holds relative positions of the resolver rotor core in a circumferential direction and the axial direction to the rotor shaft, wherein the resolver rotor core holder includes:

an annular flat plate portion;

a second constraining portion that is formed to protrude from an inner edge side of the flat plate portion with being sandwiched between two groove portions formed in the inner edge side of the flat plate portion and holds a relative position of the resolver rotor core holder to the rotor shaft; and a fourth constraining portion that is formed on an inner edge side of the flat plate portion and holds a relative position of the resolver rotor core in the axial direction to the rotor shaft and holds an angle of the resolver rotor core in the circumferential direction relative to the rotor shaft, and the resolver rotor core includes a constraining hole formed to engage with the fourth constraining portion.

8. The resolver rotor according to claim 7, wherein the fourth constraining portion has a stepped base end portion formed at a connection portion with the flat plate portion to approach the side of the resolver rotor core, and further has an insertion portion formed at a tip portion thereof to engage with the constraining hole.

9. The resolver rotor according to claim 7, wherein a convex portion whose distance from an outer edge of the flat plate portion to the center of rotation of the rotating part is large and a concave portion whose distance from the outer edge of the flat plate portion to the center of rotation of the rotating part is small are alternately formed, and thereby a wide-width portion and a narrow-width portion are formed alternately at the flat plate portion, the second constraining portion is arranged at the circumferential center of each of the wide-width portions, and the fourth constraining portion is arranged on the side of the narrow-width portion adjacent to the second constraining portion.

10. The resolver rotor according to claim 7, wherein the second constraining portion includes:

two claw portions that are provided on both sides of the protruding portion in the circumferential direction and hold a relative portion of the resolver rotor core holder to the rotor shaft; and in a state where the resolver rotor core holder is installed in the rotor shaft, the two claw portions are pressed against the rotor shaft by elastic force of the protruding portion.

11. A resolver, comprising:

the resolver rotor according to claim 7; and a resolver stator including: a cylindrical resolver core arranged at a radially outer side of the resolver rotor core of the resolver rotor with a gap provided therebetween; and a resolver winding wound around the resolver core.

* * * * *